A. DANIELSSON.
LIMIT GAGE.
APPLICATION FILED DEC. 5, 1919.
1,394,974.
Patented Oct. 25, 1921.
2 SHEETS—SHEET 1.
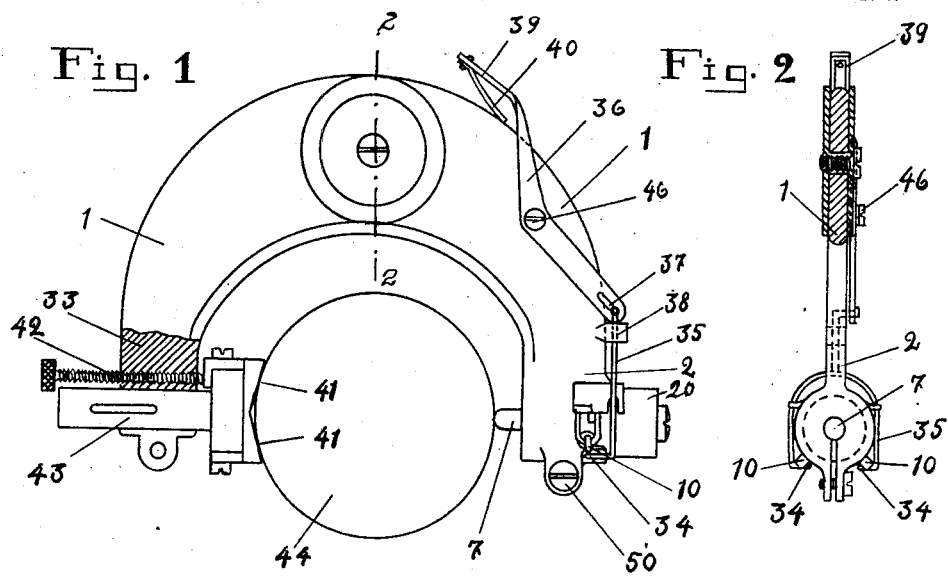
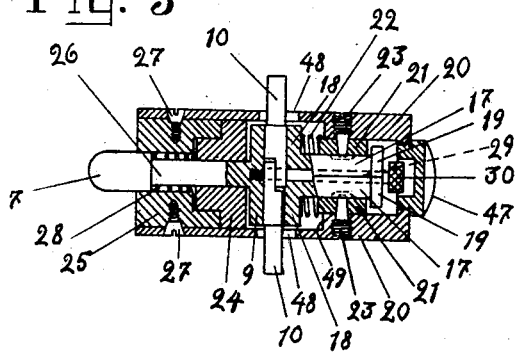
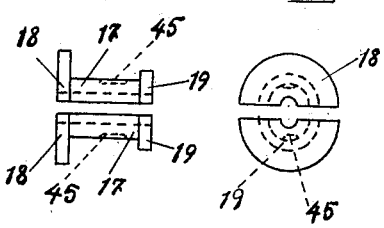
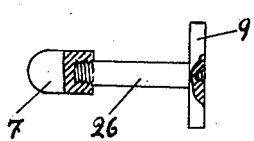
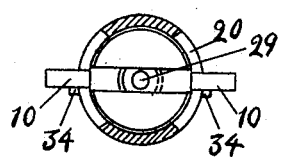
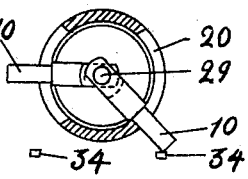
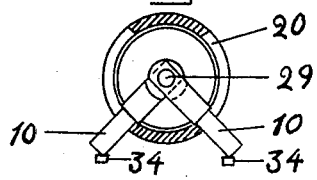
Inventor
A. Danielsson
By H. R. Kerslake
Attorney A. DANIELSSON.
LIMIT GAGE.
APPLICATION FILED DEC. 5, 1919.
1,394,974.
Patented Oct. 25, 1921.
2 SHEETS—SHEET 2.
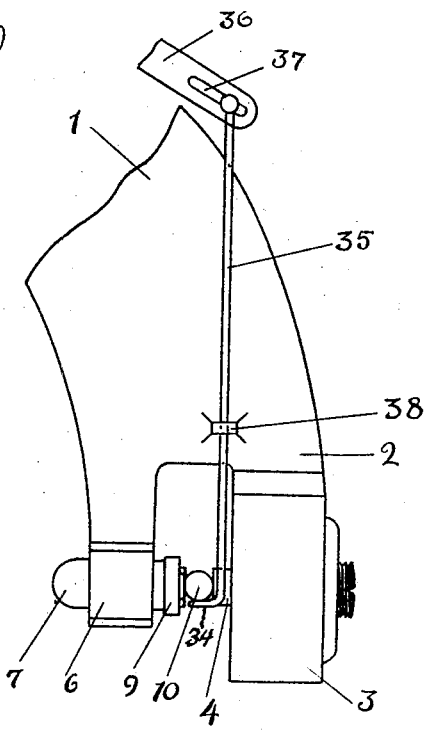
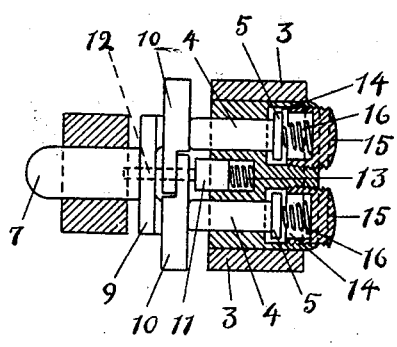
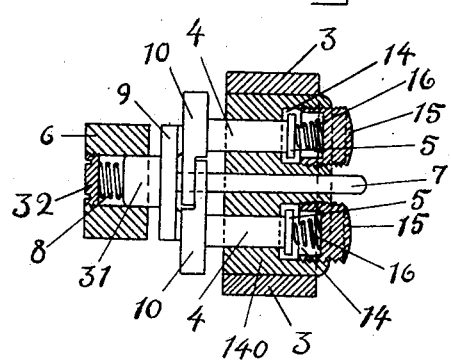
Inventor
A. Danielsson
By H. R. Kerslake
Attorney

UNITED STATES PATENT OFFICE.

AXEL DANIELSSON, OF GOTTENBORG, SWEDEN, ASSIGNOR TO NORDISKA KULLAGER AKTIEBOLAGET, OF SWEDEN.

LIMIT-GAGE.

1,394,974.      Specification of Letters Patent.      Patented Oct. 25, 1921.

Application filed December 5, 1919. Serial No. 342,798.

*To all whom it may concern:*

Be it known that I, AXEL DANIELSSON, a subject of the King of Sweden, residing at Gottenborg, in the county of Gottenborg and Bohus and Kingdom of Sweden, have invented new and useful Improvements in Limit Gages, (for which I have filed an application in Sweden Sept. 14, 1918,) of which the following is a specification.

This invention refers to limit gages and has for its object to provide improvements to facilitate the operation of the gage. One object of this invention is to provide means for the exact applying of the instrument upon the object to be measured. Another object of the invention is to provide means for an automatic indication of the measures taken without need of removing the gage away from the object to be gaged.

This invention will be clearly understood by reference to the accompanying drawings, in which the same parts are indicated by the same characters in the different views.

In the drawings, Figure 1 is a side elevation of the gage partly in section, Fig. 2 a cross section of same on the line 2—2 in Fig. 1, Fig. 3 is a section on a horizontal plane through the measuring device according to one embodiment of the invention, Fig. 4 is a side elevational detail, Fig. 5 an end view of the same parts as in Fig. 4, Fig. 6 another detail of the measuring device, Fig. 7 a transverse section through the last mentioned device with the indicators in inoperative position ready for use, Fig. 8 is a view similar to Fig. 7 but with one of the indicators arranged in an operative position, Fig. 9 is a view similar to Fig. 8 but with both the indicators arranged in an operative position, Fig. 10 a side elevation of a portion of another embodiment of the invention suited for external measurements, Fig. 11 a section on a horizontal plane through the measuring device of the gage shown in Fig. 10, and Fig. 12 a similar section of the measuring device according to the same embodiment as shown in Fig. 11 but adapted for internal measurements.

In the drawing 1 denotes the body of the gage, which is provided with two branches 2 and 33, each carrying a contact device the branch 2 being provided with a measuring stud 7 and the opposite branch 33 with an angularly tapered surface 41 offering two contact points for the object 44 to be measured. The device in the branch 33 consists of a cylindrical body 43 lengthwise adjustabe in the direction of the opposite stud 7 by means of a micrometer screw 42 and provided with the angularly tapered surface 41. The object 44 to be measured is steadily held in proper position between the two contact points on said surface 41 and the end of the stud 7.

In the branch 2 the measuring device is arranged. In Figs. 1 and 3 said device is contained in a cylindrical casing 20 and consists of two indicators 10 hinged upon a common pin 29, which is screwed centrally into a spindle 26, and these indicators project through oblong slots 48 in the casing 20. The spindle 26 has a large flange 9 at one end and carries the stud 7 on the other end and is reciprocable within a bushing 24 provided within the casing 20. The reciprocating stud 7 is guided by a bushing 25, also provided within the casing 20 and secured thereto by means of set screws 27. The indicators 10 are pivoted on the pin 29 and between the flange 9 and a flange 18 provided on a bushing 17 composed of two half cylinders (see Figs. 4 and 5). The bushing 17 is also provided with flanges 19 at the opposite end and with notches 45 on the outside of the cylindrical surface. The bushing 17 is reciprocable within another bushing 21, secured to the casing 20 by means of setscrews 23, which go through the walls of the stationary support or bushing 21 and project within the notches 45 thus preventing the bushing 17 from turning around. The pin 29 extends through the center bore of the bushing 17 and is provided with a head 30. The open end of the casing 20 opposite the stud 7 is covered by a threaded plug 47. A spring 22 is provided between the flange 18 and the end of the bushing 21, and another spring 28 is provided between a shoulder on the stud 7 and the bushing 24. When pressure is applied on the stud 7 pushing the same into the casing 20, the indicators 10 will be compressed between the flanges 9 and 18 against the action of the spring 22, and the flange 19 becomes separated from the coöperating end of the bushing 21. By releasing the pressure upon the stud 7 the parts 19, 18, 10, 9, etc., are moved by the action of the spring 22 outwardly (at the left hand according to Fig. 3) until the portion of the flange 19 on the one half cylinder 17 abuts against the coöperating end of the bushing 21, the distance between 9 and 19 on the two halves of the cylinder 17 being unequal as explained below. At this moment the flange portion 18 on the same half cylinder 17 is stopped in its left hand motion and the corresponding indicator 10 released from the action between flanges 9 and 18. If the gage is held in such a position, that the two indicators 10 originally assume a horizontal position as shown in Fig. 7, then one of the indicators released at the moment just mentioned will drop down by the influence of the power of gravity as shown in Fig. 8. When further moving the stud 7 outwardly the flange portion 19 on the other half cylinder 17 will abut against the coöperating end of the bushing 21 and cause the releasing of the other indicator 10, which accordingly drops down as shown in Fig. 9. It is to be understood in connection with the foregoing that the distances between the flange 9 and the flanges 19 on the right hand edge of the bushing 17 should be selected so as to insure of the releasing of one of the indicators 10 before the other.

When using the gage to determine if the diameter of the cylindrical object 44 in Fig. 1 has a size within the required limits, it has to be applied so that the object 44 will securely rest against the two contact points of the angular surface 41 and thereby push the stud 7 into the measuring device (to the right hand part of the figure). If the stud 7 is now moved so far that the two flange portions 19 leave the contact with the bushing 21, and the indicators 10 are lifted up by the operator to the horizontal position, the indicators will be held in said position by means of the spring pressure between the flanges 9 and 18, whereby the device indicates, that the diameter of the object 44 is somewhat too large. If on the other hand only one of the indicators is kept in its horizontal position and the other drops down as in Fig. 8, the device indicates, that the diameter of the object 44 has a size within the required limits. If both the indicators 10 drop down as in Fig. 9 this indicates a somewhat too small diameter for the object 44.

A somewhat modified embodiment of this invention is shown in the Figs. 10, 11 and 12. The branch 2 of the gage here is formed into two shanks 3 and 6, in which the measuring device is applied leaving proper space for the two indicators 10. The shanks 3 and 6 are provided each with a boring parallel to the direction of the center line of the spindle 43, Fig. 1, the boring in the one shank 6 being provided to take the stud 7 and the boring in the other shank 3 to take two parallel pistons 4 movable lengthwise into a bushing 140, and by the action of springs 16 the two indicators 10 are pressed against a head 9 provided on the rear end of the stud 7. The indicators 10 are hinged upon a pin 12 fitted centrally into the head 9 and provided on the opposite end with a plunger 11 operative in a central boring in the bushing 140 in the shank 3 and forced outwardly (to the left in Fig. 11) by means of the spring 13 located in said boring. The pistons 4 on the inner or right hand end are each provided with a head 5 movable within enlarged borings 14 in the bushing 140. Springs 16 are applied between said heads 5 and the bottom of hollow plugs 15 threaded into said enlarged borings 14.

The operating of the gage according to the last mentioned embodiment is exactly the same as previously described in connection with the first mentioned embodiment.

The measuring device according to Fig. 12 is the same as shown in Fig. 11 with the only exception, that the stud 7 is turned in the opposite direction, and the parts 12 and 11 are dispensed with, and the spring 13 substituted by a spring 8 provided within the bore in the shank 6, in which a peg 31 provided on the head 9 opposite the stud 7 is reciprocable for the purpose of guiding said head 9. The spring 8 is held by a plug 32 threaded into the shank 6. In the Fig. 12 the indicators 10 are hinged directly upon the stud 7 instead of upon a special pin.

For the convenience of lifting the indicators 10 to horizontal position a retaining device is provided as clearly shown in Figs. 1, 2 and 10, wherein 34 denotes hooks provided below the indicators 10. These hooks are shown in Figs. 8 and 9 in their lowered position and in Fig. 7 in their raised position. The hooks 34 are provided on links 35 guided in an ear 38 on the body 1 of the gage and connected with a lever 36 pivotally carried by the body 1 by means of a screw 46 and provided with an oblong slot 37 to take the angularly bent end of the links 35. By pressing down the end 39 of the lever 36 the hooks 34 are raised, carrying with them the two indicators 10 to the horizontal position shown in Fig. 7 and by releasing the pressure upon the end 39 a spring 40 on the lower side of the end 39 will restore the regular position of the lever 36 and thus lower the hooks 34, so that the indicators 10 will be free to drop when operative.

The invention is not limited to the embodiments shown in the drawings and here described but may be carried out in different ways without departing from the scope of the invention. Thus the two contact points between the object 44 to be measured and the angular surface 41 in Fig. 1 may be achieved for instance by substituting the angular surface 41 for two studs with rounded ends. Neither is there any necessity to provide the casing 20 with the measuring device in a common caliper as illustrated as the same may be mounted directly for instance in a lathe as an integral part of the lathe so as to be movable lengthwise over the workpiece to be measured and removed to the side between the measuring operations. From the above it will be obvious, that the casing 20 may be removed from the gage and substituted by another casing with a measuring device suited for measures between other limits. It is mentioned above, that the gage when operative is to be held in such a position, that the indicators 10 may be lifted up into a horizontal position, in order to let the power of gravity influence the indicators when released. However the indicators also may be actuated upon by suitably arranged springs, by which they may become operative in cases when the gage is held in any arbitrary position relative to the horizontal.

Having now particularly described and ascertained this invention what is claimed as new is:

1. In a limit gage of the class specified, a body, an object contacting and supporting element on one end of the body, a longitudinally movable stud on the opposite end of the body for contacting with the object and two indicators pivotally and yieldably mounted rearwardly and centrally of the stud for coacting with the stud for indicating the size of the object to the gage.

2. In a limit gage of the class specified, a body, an object contacting and supporting element on one end of the body, a longitudinally movable stud on the opposite end of the body for contacting with the object, a plurality of indicators of various thicknesses pivotally mounted rearwardly of the stud and independently operating tensioning means coacting with the indicators and the movable stud.

3. In a limit gage a measuring device comprising a body, a supporting element carried at one end of the body, a longitudinally movable measuring stud mounted in the opposite end of the body, two relatively movable indicators provided at the rear end of the measuring stud, means to hold said indicators in an inactive position in which they have been set by the operator under the influence of the pressure set up in the measuring stud from the object to be measured, and means for releasably retaining said indicators independently of one another when said pressure ceases.

4. In a limit gage of the class specified, a body, a supporting element on one end of the body, a longitudinally movable measuring stud on the opposite end of the body and provided with a flange, two indicators on the rear end of the measuring stud, a longitudinally movable spring controlled bushing divided into two halves encircling said measuring stud and provided with flanges on each end, a stationary support rearwardly of the bushing, the flanges on one end of the bushing halves coöperating with the flange on the measuring stud, the flanges on the opposite end of the bushing halves being provided to coöperate with the stationary support to limit the longitudinal movement of the bushing halves and means for positively holding the indicators in an inactive position.

In testimony whereof I have affixed my signature.

AXEL DANIELSSON.